| (12) | United States Patent | (10) Patent No.: | US 10,873,098 B2 |
|---|---|---|---|
| | Saito et al. | (45) Date of Patent: | Dec. 22, 2020 |

(54) FUEL CELL SYSTEM AND METHOD OF IDENTIFYING POWER LEAKAGE AREA

(71) Applicant: TOYOTA JIDOSHA KABUSHIKI KAISHA, Toyota (JP)

(72) Inventors: Hiromu Saito, Toyota (JP); Keiichi Toriumi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 40 days.

(21) Appl. No.: 16/111,545

(22) Filed: Aug. 24, 2018

(65) Prior Publication Data

US 2019/0067718 A1    Feb. 28, 2019

(30) Foreign Application Priority Data

Aug. 29, 2017    (JP) ................................ 2017-163970

(51) Int. Cl.
*H01M 8/04537*    (2016.01)
*H01M 8/04228*    (2016.01)

(52) U.S. Cl.
CPC ... *H01M 8/04619* (2013.01); *H01M 8/04228* (2016.02); *H01M 8/04559* (2013.01); *H01M 8/04649* (2013.01); *H01M 2250/20* (2013.01)

(58) Field of Classification Search
None
See application file for complete search history.

(56) References Cited

U.S. PATENT DOCUMENTS

| 2002/0159280 A1* | 10/2002 | Zhu ........................ H02M 1/34 363/98 |
|---|---|---|
| 2009/0096464 A1 | 4/2009 | Tanaka et al. |
| 2012/0013183 A1 | 1/2012 | Yoshida et al. |
| 2018/0229622 A1* | 8/2018 | Matsumoto ........... H02M 3/155 |

FOREIGN PATENT DOCUMENTS

| JP | 2009-093822 | 4/2009 |
|---|---|---|
| JP | 2010-238544 | 10/2010 |
| JP | 2011-003445 | 1/2011 |
| JP | 2014-036467 | 2/2014 |

OTHER PUBLICATIONS

JP 2009-093822—An English language abstract of this documents is enclosed. Upon information and belief, this document is a counterpart of listed US 2009/0096464.
JP 2010-238544—An English language abstract of this documents is enclosed. Upon information and belief, this document is a counterpart of listed US 2012/0013183.
JP 2011-003445—An English language translation of this documents is enclosed.
JP 2014-036467—An English language translation of this documents is enclosed.

* cited by examiner

*Primary Examiner* — Carmen V Lyles-Irving
(74) *Attorney, Agent, or Firm* — Finnegan, Henderson, Farabow, Garrett & Dunner, LLP

(57) ABSTRACT

When reduction of insulation resistance is detected, an FC positive side relay is opened, and a switching element is turned OFF. When the insulation resistance has returned to a normal value as a result of the relay opening and the switching element turning OFF, it is identified that the power leakage is occurring in the area between the positive side relay and the diode.

10 Claims, 8 Drawing Sheets

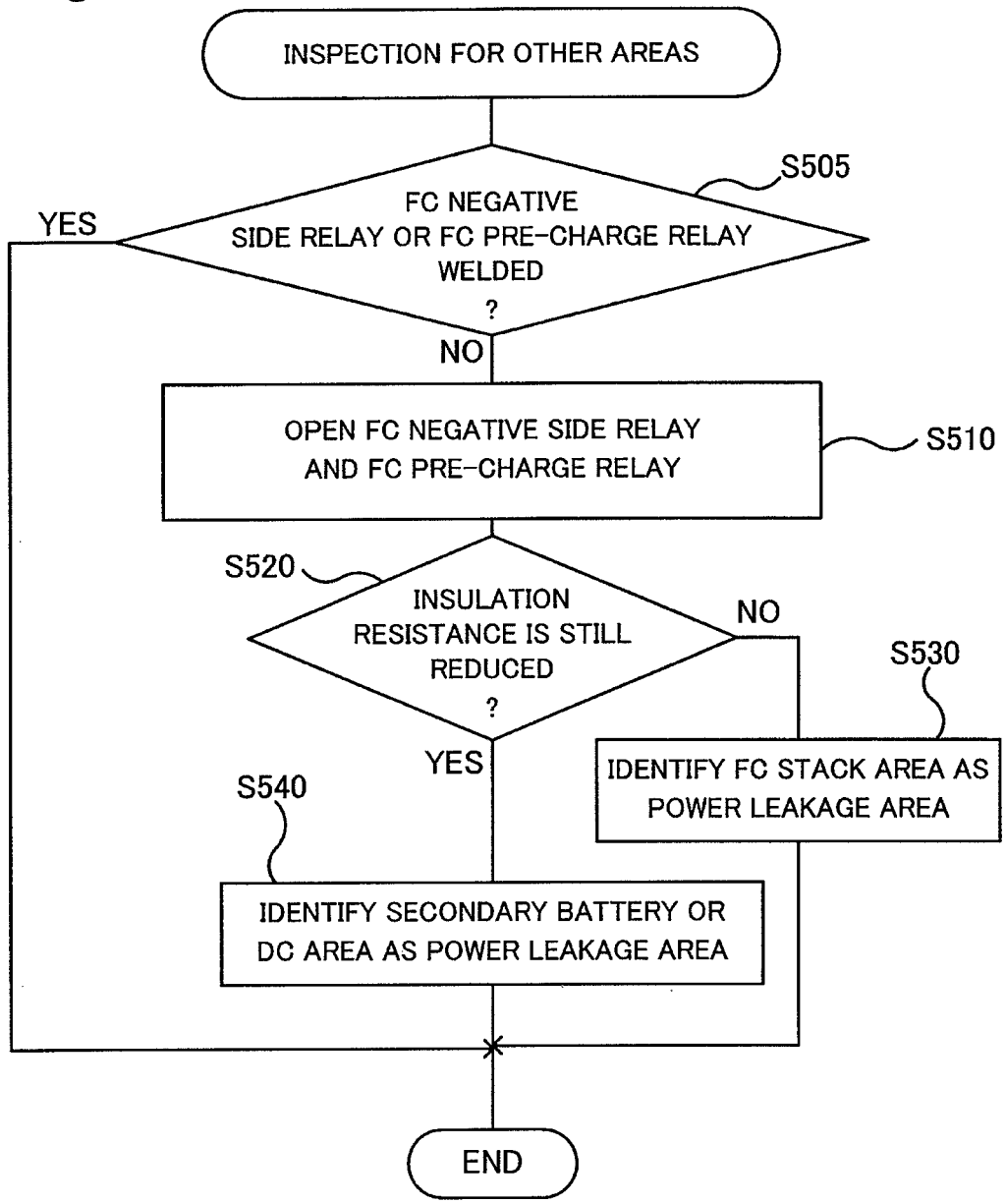

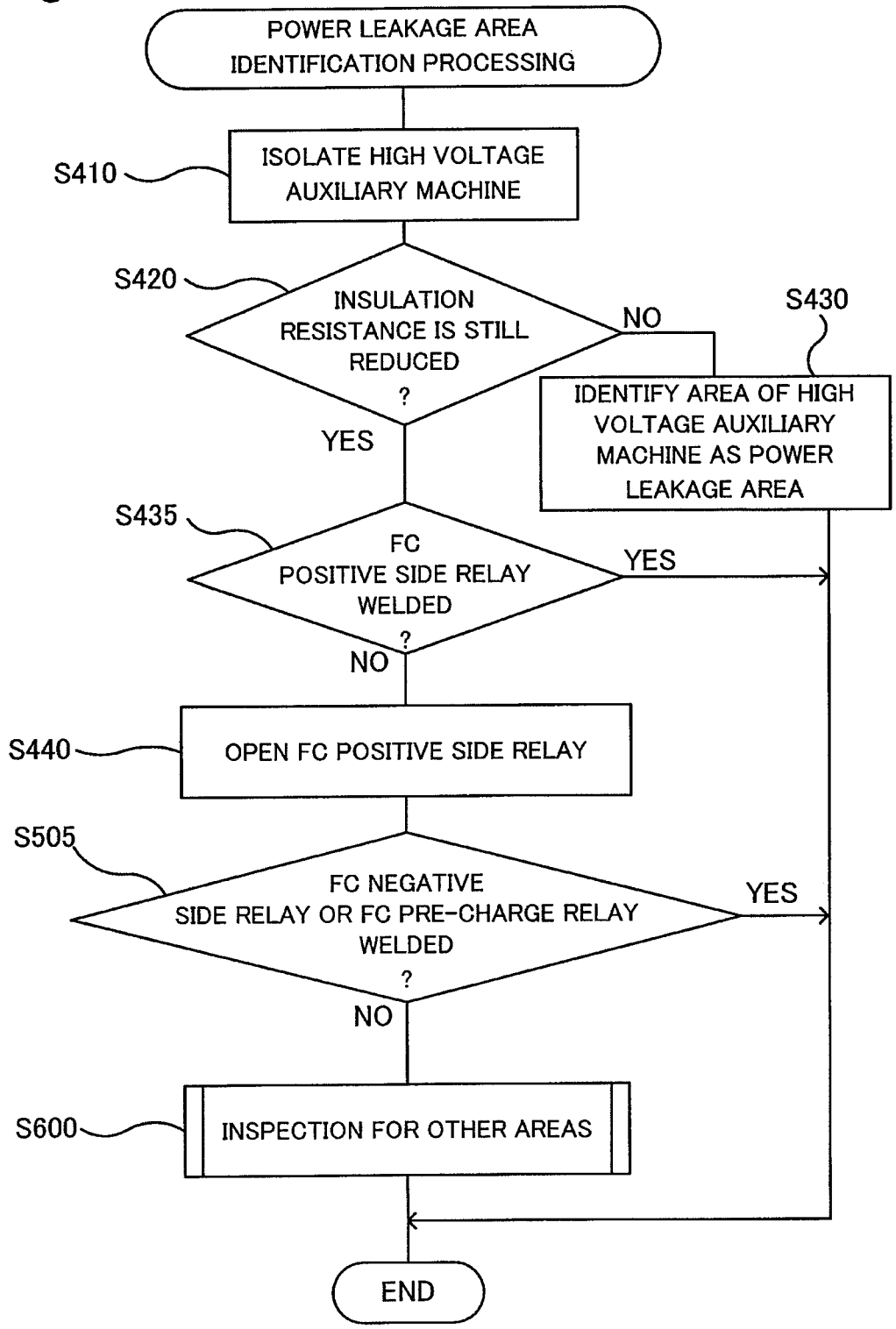

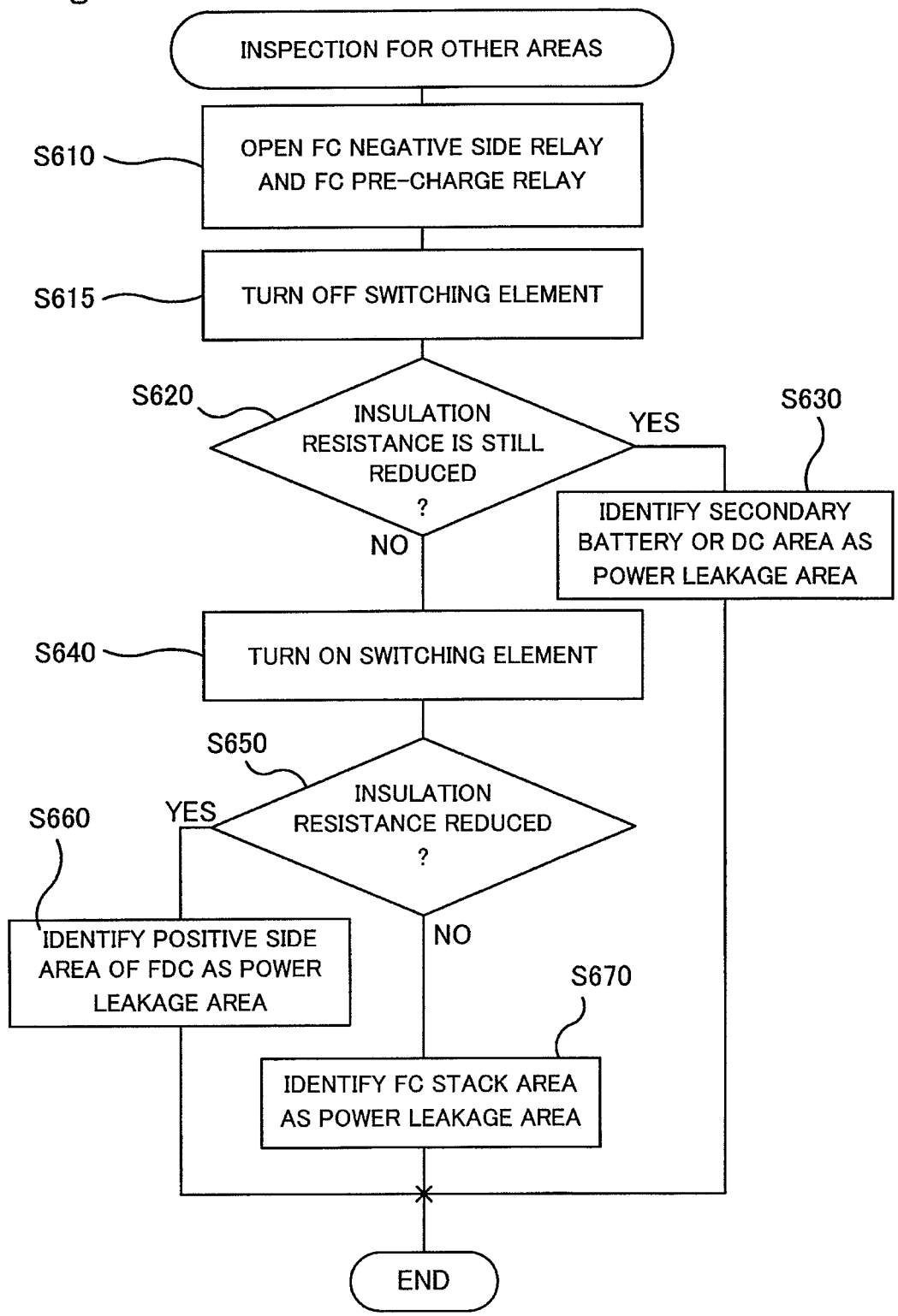

FUEL CELL SYSTEM AND METHOD OF IDENTIFYING POWER LEAKAGE AREA

CROSS-REFERENCE TO RELATED APPLICATION

This application claims priority to Japanese Patent Application No. 2017-163970, filed Aug. 29, 2017, the entire disclosure of which is incorporated by reference herein for all purpose.

BACKGROUND

The present disclosure relates to power leakage inspection.

JP 2014-036467A discloses a method of identifying a power leakage area in an electrical system including a power source and a load installed on a hybrid vehicle. Specifically, a power controller having a power interruption function is disposed on a power path between a power source and a load. The state of the power controller transitions between a power interrupted state and a power uninterrupted state. An area where reduction of insulation resistance has occurred is identified based on a magnitude of change in an output from a detector as a result of the state transition.

A fuel cell vehicle is similar to hybrid vehicles in that the fuel cell vehicle includes an electrical system including a power source and a load. The fuel cell vehicle generally includes a backflow preventing diode on a positive electrode side of a fuel cell stack. The fuel cell vehicle further includes a relay circuit with which the fuel cell stack is electrically connected to and disconnected from the load. The relay circuit includes a positive side relay and a negative side relay respectively corresponding to a positive electrode and a negative electrode of the fuel cell stack. The positive side relay and the negative side relay are hereinafter also collectively referred to as both side relays.

The relay circuit may be arranged between the fuel cell stack and the backflow preventing diode. In such an arrangement, the positive side relay is arranged between the diode and the positive electrode of the fuel cell stack.

The fuel cell vehicle may further include a capacitor for establishing connection in a certain area. The connection established in the certain area is a connection between positive side wiring and negative side wiring of the fuel cell stack, established with a positive side connection area positioned between the positive side relay and the backflow preventing diode. With this configuration, a power leakage detection signal reaches an area between the positive side relay and the backflow preventing diode, even in a state where both side relays are open.

In a configuration without the capacitor, the power leakage detection signal cannot reach the area between the positive side relay and the backflow preventing diode when both side relays are open. Thus, even when the insulation resistance returns to a normal value as a result of opening both side relays for inspecting whether the fuel cell stack is the power leakage area, it is cannot be determined whether an area between the positive side relay and the backflow preventing diode or the fuel cell stack is the power leakage area.

In view of the above, in identifying the power leakage area, enabling the area between the positive side relay and the backflow preventing diode to be distinguished from other areas is desired.

SUMMARY

According to a first aspect, a fuel cell system is provided. The fuel cell system according to the first aspect comprises a fuel cell stack, a diode that prevents backflow of current to a positive electrode of the fuel cell stack, a relay circuit including a negative side relay corresponding to a negative electrode of the fuel cell stack and a positive side relay arranged between the positive electrode of the fuel cell stack and the diode, a power leakage detector configured to output a power leakage detection signal to be input to the fuel cell stack via the negative side relay, and detects reduction of insulation resistance, and a controller configured to perform control of opening/closing the positive side relay, perform control of opening/closing the negative side relay, and acquires a detection result by the power leakage detector. The controller further configured to execute isolation processing of opening the positive side relay when the reduction of the insulation resistance is detected in a state where the positive side relay and the negative side relay are closed. The controller further configured to identify that power leakage is occurring in an area between the positive side relay and the diode when the insulation resistance has returned to a normal value as a result of the isolation processing. With the first aspect, the area between the positive side relay and the backflow preventing diode can be distinguished from other areas, for identifying the power leakage area.

In the first aspect, the controller may be configured to open the negative side relay when the insulation resistance is still reduced after the isolation processing, and may be configured to identify that the power leakage is occurring in an area of the fuel cell stack when the insulation resistance has returned to the normal value as a result of opening the negative side relay. With this configuration, when power leakage is occurring in the area of the fuel cell stack, it is possible to identify the power leakage is occurring in the area.

In the first aspect, the controller may be configured to open the negative side relay when the insulation resistance is still reduced after the isolation processing, and may be configures to identify that the power leakage is occurring in an area other than the area between the positive side relay and the diode or an area other than an area of the fuel cell stack when the insulation resistance is still reduced after the negative side relay has been opened. With this configuration, when the power leakage is occurring in an area other than the area between the positive side relay and the diode and other than the area of the fuel cell stack, it is possible to identify the power leakage is occurring in the area.

According to a second aspect, a fuel cell system is provided. The fuel cell system according to the second aspect comprises a fuel cell stack, a diode that prevents backflow of current to a positive electrode of the fuel cell stack, a switching element disposed between the fuel cell stack and the diode and has a function of switching a conductive state between wiring connected to a negative electrode of the fuel cell stack and wiring connected to the positive electrode of the fuel cell stack, a relay circuit disposed between the fuel cell stack and the switching element. The relay circuit includes a positive side relay corresponding to the positive electrode of the fuel cell stack; and a negative side relay corresponding to the negative electrode of the fuel cell stack, a power leakage detector configured to output a power leakage detection signal to be input to the fuel cell stack via the negative side relay, and detects reduction of insulation resistance, and a controller configured to perform control of opening/closing the positive side relay, perform control of opening/closing the negative side relay, perform control of the switching element, and acquire a detection result by the power leakage detector. The controller further configured to execute isolation processing including opening the positive side relay, opening the negative side relay, and putting the switching element in an isolated state when the reduction of the insulation resistance is detected in a state where the positive side relay and the negative side relay are closed. The controller further configured to execute conduction control of putting the switching element in a conductive state while maintaining a state where the positive side relay and the negative side relay are open when the insulation resistance has returned to a normal value as a result of the isolation processing. The controller further configured to identify that power leakage is occurring in an area between the positive side relay and the diode when the reduction of the insulation resistance occurs as a result of the conduction control of putting the switching element in the conductive state. With the second aspect, the area between the positive side relay and the backflow preventing diode can be distinguished from other areas, for identifying the power leakage area.

In the second aspect, the controller may be configured to identify that the power leakage is occurring in an area of the fuel cell stack when the insulation resistance is at a normal value after the conduction control. With this configuration, when power leakage is occurring in the area of the fuel cell stack, it is possible to identify the power leakage is occurring in the area.

In the second aspect, the controller may be configured to identify the power leakage is occurring in an area other than the area between the positive side relay and the diode or an area other than an area of the fuel cell stack when the insulation resistance is still reduced after the isolation processing. With this configuration, when the power leakage is occurring in an area other than the area between the positive side relay and the diode and other than the area of the fuel cell stack, it is possible to identify the power leakage is occurring in the area.

The fuel cell system according to the second aspect may further comprise a high voltage auxiliary machine and a circuit capable of electrically isolating the high voltage auxiliary machine from the fuel cell stack, and the controller may be configured to control the circuit to electrically isolate the high voltage auxiliary machine from the power leakage detector, before executing the isolation processing, and may identify an area of the high voltage auxiliary machine to be the area where the power leakage is occurring when the insulation resistance has returned to the normal value as a result of isolating the high voltage auxiliary machine. With this configuration, it is possible to identify the power leakage is occurring in an area of the high voltage auxiliary machine before the isolation processing is executed.

In the second aspect, the controller may be configured to execute the isolation processing when the fuel cell system transitions to a stopped state. With this configuration, power supply by the fuel cell stack needs not to be interrupted.

According to a third aspect, a method of identifying an area where power leakage is occurring in a fuel cell system including a fuel cell stack is provided. The method of the third aspect comprises inputting a power leakage detection signal to the fuel cell stack via a negative side relay corresponding to a negative electrode of the fuel cell stack, in a state where the negative side relay and a positive side relay arranged between a positive electrode of the fuel cell stack and a diode preventing backflow of current to the positive electrode are closed; executing isolation processing of opening the positive side relay when reduction of insulation resistance is detected as a result of inputting the signal; and identifying that power leakage is occurring in an area between the positive side relay and the diode when the insulation resistance has returned to a normal value as a result of the isolation processing.

According to a fourth aspect, a method of identifying an area where power leakage is occurring in a fuel cell system including a fuel cell stack is provided. The method of the fourth aspect comprises inputting a power leakage detection signal to the fuel cell stack via a negative side relay corresponding to the negative electrode of the fuel cell stack, in a state where the negative side relay and a positive side relay arranged between a positive electrode of the fuel cell stack and a diode preventing backflow of current to the positive electrode are closed; executing, when reduction of insulation resistance is detected as a result of inputting the signal, isolation processing including opening the positive side relay, opening the negative side relay and putting a switching element arranged between the fuel cell stack and the diode and has a function of switching a conductive state between wiring connected to a negative electrode of the fuel cell stack and wiring connected to the positive electrode of the fuel cell stack in an isolated state; executing, when the insulation resistance has returned to a normal value as a result of the isolation processing, conduction control of controlling the switching element to be in a conductive state while maintaining a state where the positive side relay and the negative side relay are open; and identifying that power leakage is occurring in an area between the positive side relay and the diode when the reduction of the insulation resistance occurs as a result of the conduction control.

According to the method of the third and fourth aspects, the same functional effects as in the first and second aspects can be obtained, respectively. The present disclosure can be implemented with various aspects other than those described above. For example, the present disclosure can be implemented in such aspects as a program for implementing the method, a non-transitory storage medium storing the program, and the like.

BRIEF DESCRIPTION OF DRAWINGS

FIG. 6 is a flowchart illustrating inspection for other areas;
FIG. 7 is a flowchart illustrating power leakage area identification processing;
FIG. 8 is a flowchart illustrating inspection for other areas.

DESCRIPTION OF EMBODIMENTS

Figure 1:
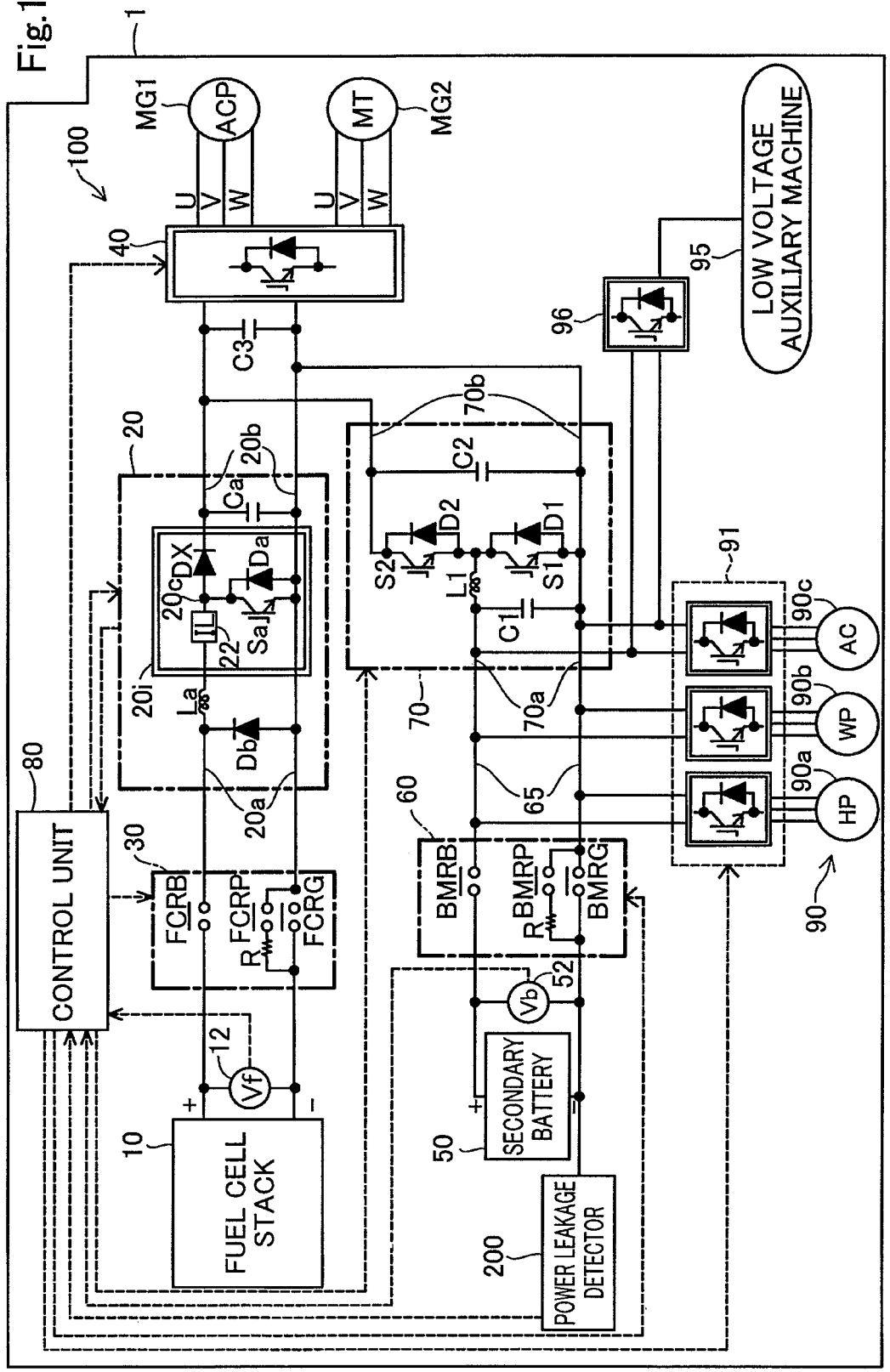
FIG. 1 is a diagram illustrating a fuel cell system.

A first embodiment is described. FIG. 1 illustrates a fuel cell system 100. The fuel cell system 100 is installed on a fuel cell vehicle 1. The fuel cell system 100 includes a fuel cell stack 10, an FDC 20, an FC relay circuit 30, an inverter 40, an air compressor MG1, a drive motor MG2, a secondary battery 50, a secondary battery relay circuit 60, a secondary battery step-up converter 70, a controller 80, a capacitor C3, and a power leakage detector 200. The FDC is a DC/DC converter.

The fuel cell stack 10 is formed by stacking a plurality of unit cells, and generates power through electrochemical reaction between hydrogen and air. Each of the unit cells is a power generating element that can independently generate power. The unit cell includes a membrane electrode assembly and separators disposed on both side of the membrane electrode assembly. The membrane electrode assembly is a power generator having electrodes disposed on both surfaces of an electrolyte membrane.

A fuel cell voltage sensor 12 is disposed on an output terminal of the fuel cell stack 10, and measures voltage output from the fuel cell stack 10. The fuel cell voltage sensor 12 inputs a signal indicating a voltage measurement value Vf to the controller 80.

The air compressor MG1 is located on an air system for supplying compressed air to the fuel cell stack 10. The drive motor MG2 converts three-phase AC power into rotary force to rotate the wheels (not illustrated) of the fuel cell vehicle 1.

The inverter 40 convers DC power, supplied from the secondary battery 50 and the fuel cell stack 10, into the three-phase AC power. The inverter 40 supplies the power, obtained by the conversion, to the drive motor MG2 and to a motor provided to the air compressor MG1. The capacitor C3 is arranged between the inverter 40 and connection points between secondary side wiring 20b and secondary side wiring 70b.

The FDC 20 is arranged between the fuel cell stack 10 and the inverter 40. The FC relay circuit 30 is arranged between the FDC 20 and the fuel cell stack 10. The FDC 20 and the fuel cell stack 10 are connected to each other through primary side wiring 20a via the FC relay circuit 30. The FDC 20 and the inverter 40 are connected to each other through the secondary side wiring 20b. The primary side is a side to which power is supplied, and thus is an input side. The secondary side is a side from which power is supplied, and thus is an output side.

Electrical connection between the fuel cell stack 10 and the FDC 20 is established and released by the FC relay circuit 30. The FC relay circuit 30 includes an FC positive side relay FCRB, an FC negative side relay FCRG, an FC pre-charge relay FCRP, and a limiting resistor R. These three relays are each a normally open type relay. The relay is also referred to as a relay contact.

The FC pre-charge relay FCRP is connected in parallel with the FC negative side relay FCRG. The limiting resistor R is connected in series with the FC pre-charge relay FCRP. The limiting resistor R prevents the FC negative side relay FCRG from being welded.

The FDC 20 raises the voltage of power generated by the fuel cell stack 10. The FDC 20 supplies the power with the raised voltage to the inverter 40. The FDC 20 includes a step-up coil La, a step-up diode Db, a capacitor Ca, and a step-up IPM 20i. The IPM stands for intelligent power module. The coil is also referred to as a reactor.

The step-up IPM 20i includes a switching element Sa, a diode Da, a backflow preventing diode DX, and a current sensor 22.

The step-up coil La is arranged between the FC positive side relay FCRB and an anode terminal of the backflow preventing diode DX. A negative side of the fuel cell stack 10 and a point 20c between the step-up coil La and the backflow preventing diode DX are connected to each other via the switching element Sa. The switching element Sa switches the conductive state between the point 20c and the negative side. Specifically, conduction between the point 20c and the negative side is established and released by the switching element Sa. Control for establishing the conduction is referred to as ON control and control for releasing the conduction is referred to as OFF control.

The diode Da is connected in parallel with the switching element Sa. The capacitor Ca is connected between a cathode terminal side of the backflow preventing diode DX and the negative side of the fuel cell stack 10. The backflow preventing diode DX prevents backflow. The backflow is a flow of current from the secondary side wiring 20b to the primary side wiring 20a of the FDC 20.

The current sensor 22 is arranged between the step-up coil La and the point 20c, and measures current flowing through the step-up coil La. The current sensor 22 inputs a signal indicating a current measurement value IL to the controller 80.

The secondary battery 50 is connected to primary side wiring 70a of the secondary battery step-up converter 70 via the secondary battery relay circuit 60. The secondary battery 50 according to the present embodiment is a lithium ion secondary battery.

The secondary side wiring 70b is connected to wiring connecting the FC relay circuit 30 and the inverter 40 to each other. Thus, a group of circuits from the secondary battery 50 to the secondary battery step-up converter 70 is connected in parallel with a group of circuits from the fuel cell stack 10 to the FC relay circuit 30.

The secondary battery relay circuit 60 includes a secondary battery first relay BMRB, a secondary battery second relay BMRG, a secondary battery pre-charge relay BMRP, and a limiting resistor R. These three relays are each a normally open type relay.

The secondary battery pre-charge relay BMRP is connected in parallel with the secondary battery second relay BMRG. The limiting resistor R is connected in series with the secondary battery pre-charge relay BMRP. The limiting resistor R prevents the secondary battery second relay BMRG from being welded.

The secondary battery relay circuit 60 is arranged between the secondary battery 50 and the primary side wiring 70a of the secondary battery step-up converter 70. Electrical connection between the secondary battery 50 and the secondary battery step-up converter 70 is established and released by the secondary battery relay circuit 60.

The secondary battery step-up converter 70 includes switching elements S1 and S2, diodes D1 and D2, a coil L1, and capacitors C1 and C2. The secondary battery step-up converter 70 raises the voltage of power generated by the secondary battery 50. The secondary battery step-up converter 70 supplies the power with the voltage thus raised to the inverter 40. The capacitors C1 and C2 are respectively provided on the side of the primary side wiring 70a and on the side of the secondary side wiring 70b.

In an alternative embodiment, the secondary battery step-up converter 70 may be configured as a bidirectional DC/DC converter that can also lower the voltage of power supplied to the secondary side wiring 70b and supply the power with the lowered voltage to the secondary battery 50.

The output terminal of the secondary battery 50 is disposed on a secondary battery voltage sensor 52 that measures the voltage output from the secondary battery 50. The secondary battery voltage sensor 52 inputs a signal indicating a voltage measurement value Vb to the controller 80.

Various loads, receiving power supplied from the secondary battery 50, are connected to wiring 65 that connects the secondary battery relay circuit 60 and the secondary battery step-up converter 70 to each other. These loads are classified into a high voltage auxiliary machine 90 and a low voltage auxiliary machine 95.

The high voltage auxiliary machine 90 is a load requiring high driving voltage. To the high voltage auxiliary machine 90, power having the voltage raised to approximately 300 V by a step-up DC/DC converter 91 connected to the wiring 65 is supplied. The high voltage auxiliary machine 90 according to the present embodiment includes a hydrogen pump 90a, a cooling water pump 90b, and a water heater (not illustrated). The hydrogen pump 90a supplies anode exhaust gas to the fuel cell stack 10. The cooling water pump 90b circulates cooling water for cooling the fuel cell stack 10. The water heater is in charge of heating for preventing water in the fuel cell stack 10 from freezing.

The high voltage auxiliary machine 90 according to the present embodiment may include devices not included in the fuel cell system 100. For example, the high voltage auxiliary machine 90 may include an air conditioner compressor 90c.

The low voltage auxiliary machine 95 is a load requiring low driving voltage. To the low voltage auxiliary machine 95, power with voltage lowered to approximately 12 V by a step-down DC/DC converter 96 connected to the wiring 65 is supplied. The low voltage auxiliary machine 95 includes a flowrate adjustment valve, an offgas discharge mechanism, and the like. The flowrate adjustment valve is provided to a flow path for supplying and discharging hydrogen, air, and cooling water to and from the fuel cell stack 10.

The controller 80 according to the present embodiment includes a plurality of engine control units (ECUs). The controller 80 acquires a signal such as an output signal from a power switch (not illustrated) provided to the fuel cell vehicle 1, a signal from an accelerator pedal position sensor (not illustrated) for controlling the FDC 20, the FC relay circuit 30, the inverter 40, the secondary battery relay circuit 60, the secondary battery step-up converter 70, and the like.

Specifically, the controller 80 controls the FDC 20, the FC relay circuit 30, the secondary battery relay circuit 60, and the secondary battery step-up converter 70 to control power output from the fuel cell stack 10 and the secondary battery 50, and controls the inverter 40 to control output torque from a synchronous motor of the air compressor MG1 and output torque from the drive motor MG2.

The controller 80 incorporates a storage medium that stores a program therein. For example, the controller 80 executes the stored program to implement power leakage area identification processing described later.

Figure 2:
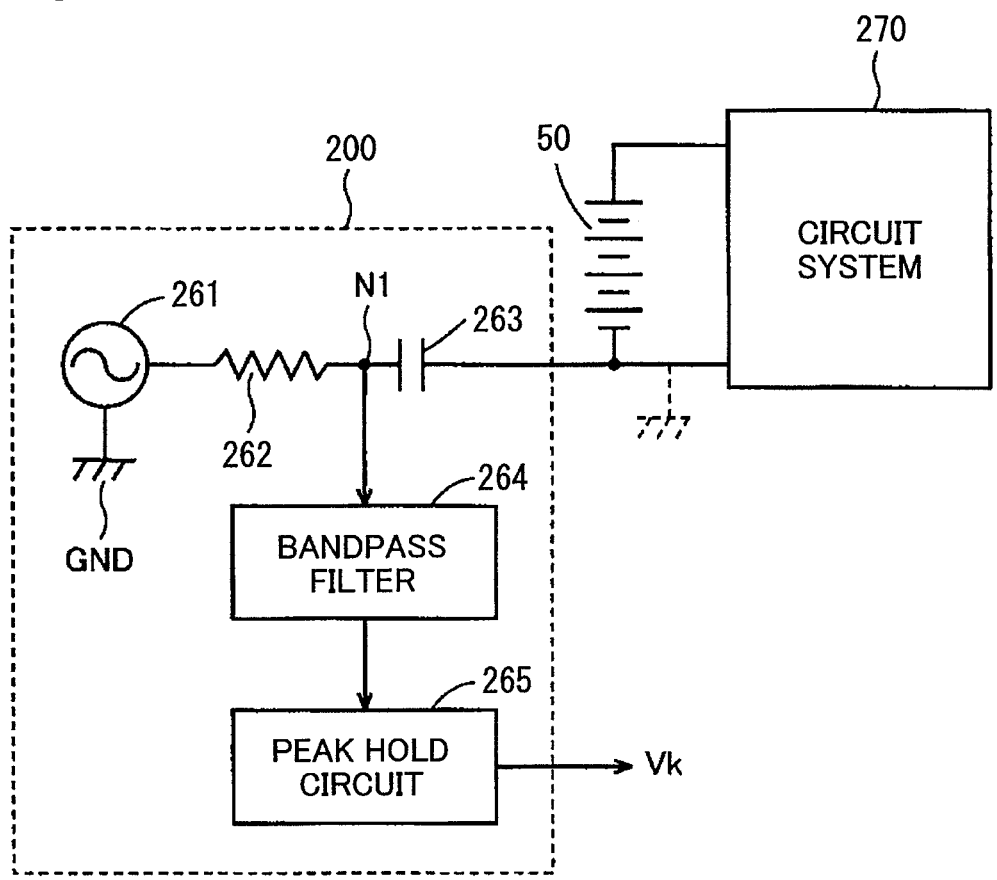
FIG. 2 is a diagram illustrating a configuration of a power leakage detector.

FIG. 2 is a diagram illustrating a configuration of the power leakage detector 200. The power leakage detector 200 includes an AC power source 261, a resistor 262, a capacitor 263, a bandpass filter 264, and a peak hold circuit 265.

The AC power source 261 and the resistor 262 are connected in series between a node N1 and a ground node GND (the chassis or the body of the fuel cell vehicle 1). The capacitor 263 is connected between the node N1 and the negative electrode of the secondary battery 50. The circuits connected to the secondary battery 50 in FIG. 1 are collectively illustrated as a circuit system 270.

The AC power source 261 outputs an AC signal at a low frequency. The AC signal is a signal for detecting power leakage. The frequency of the AC signal according to the present embodiment is 2.5 Hz. The voltage of the AC signal according to the present embodiment is 5 V. The AC signal is input to the circuit system 270 via the capacitor 263. Thus, the circuit system 270 forming a DC power source circuit is galvanically isolated form the power leakage detector 200, and thus is insulated from the ground.

The bandpass filter 264 receives the AC signal on the node N1. The bandpass filter 264 extracts a 2.5 Hz component from the AC signal received, and inputs the resultant signal to the peak hold circuit 265. The peak hold circuit 265 holds the peak of the 2.5 Hz AC signal received from the bandpass filter 264, and inputs a peak value Vk thus held to the controller 80.

The peak value Vk changes depending on whether power leakage is occurring. Thus, reduction of insulation resistance can be detected by monitoring the peak value Vk. The peak value Vk that is equal to or higher than a threshold is referred to as a normal peak value Vk. The normal peak value Vk indicates that the insulation resistance is at a normal value and thus indicates that no power leakage is occurring. The peak value Vk lower than the threshold is also referred to as reduction of insulation resistance. The reduction of insulation resistance indicates that the power leakage is occurring.

Figure 3:
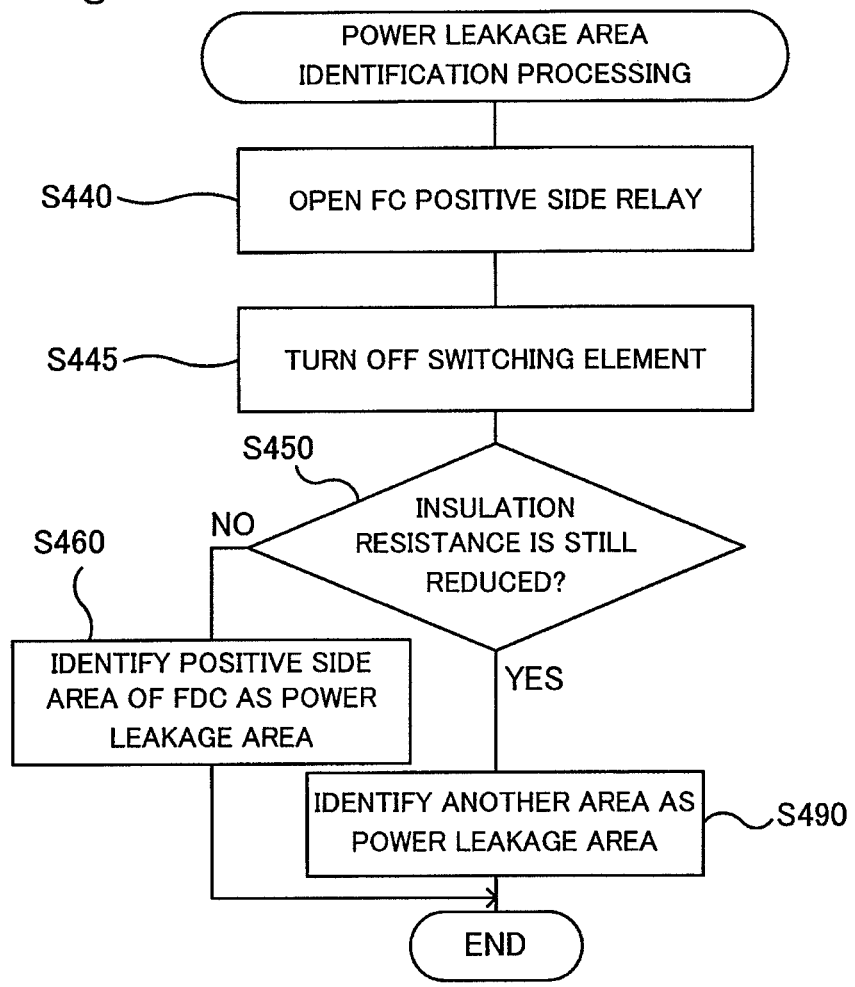
FIG. 3 is a flowchart illustrating power leakage area identification processing.

FIG. 3 is a flowchart illustrating power leakage area identification processing. The processing is executed by the controller 80 upon determining that power leakage is occurring.

First of all, the controller 80 opens the FC positive side relay FCRB (S440). In the power leakage area identification processing, a relay that is not clearly indicated to be open or closed is closed, and once a relay is open, the relay is maintained to be open. In the processing, S440 is also referred to as isolation processing according to the present embodiment.

Next, the controller 80 controls the switching element Sa to be OFF (S445). When the switching element Sa is controlled to be OFF, the AC signal is blocked by the switching element Sa. The switching element Sa may have been controlled to be OFF at the point of S440. In such a case, the controller 80 maintains the switching element Sa to be in the OFF state in S445.

Next, the controller 80 determines whether the insulation resistance is still reduced (S450). When the insulation resistance has returned to the normal value (S450, NO), the controller 80 identifies a positive side area of the FDC 20 as the power leakage area (S460). Specifically, the positive side area of the FDC 20 is an area between the FC positive side relay FCRB and the backflow preventing diode DX.

The reason behind this determination is because the closed FC positive side relay FCRB enables the AC signal to reach the area between the FC positive side relay FCRB and the backflow preventing diode DX via the fuel cell stack 10. In such a case, the negative and positive electrodes of the fuel cell stack 10 respectively function as an inlet and an outlet for the AC signal.

When the insulation resistance is still reduced (S450, YES), another area is identified as the power leakage area (S490).

The controller 80 stores the identification result in the storage medium incorporated therein. The same applies to when the power leakage area is identified in steps mentioned below. The controller 80 outputs a failure code, indicating the stored content, in response to a request from the outside.

The present embodiment described above prevents erroneous determination of identifying the power leakage is actually occurring in an area other than the positive side area of the FDC 20, when the power leakage is actually occurring in the positive side area of the FDC 20.

Next, a second embodiment is described. The description on the second embodiment mainly focuses on matters different from the first embodiment. Matters not specifically described are the same as those in the first embodiment.

Figure 4:
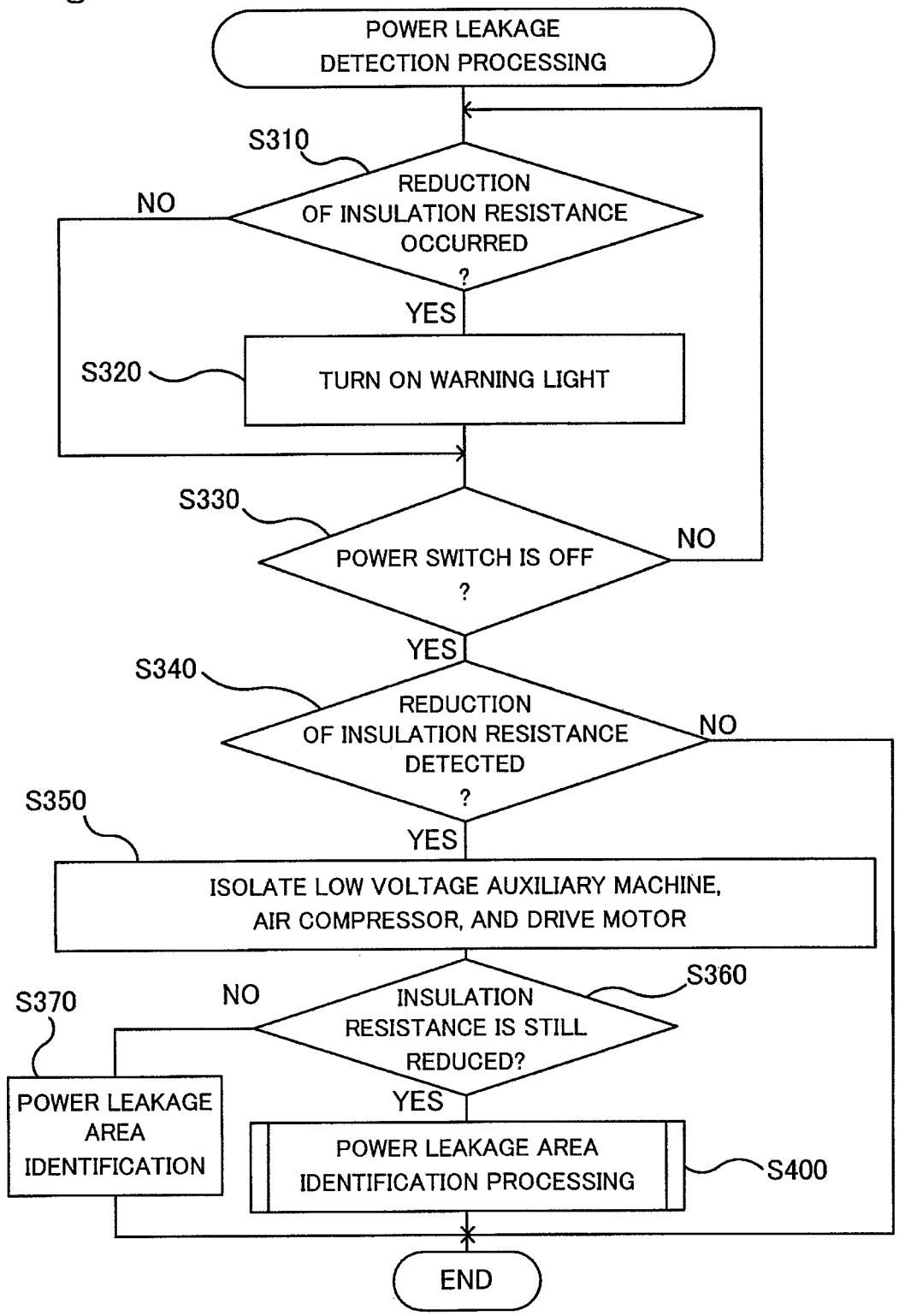
FIG. 4 is a flowchart illustrating power leakage detection processing.

FIG. 4 is a flowchart illustrating power leakage detection processing. The controller 80 repeatedly executes this processing after the fuel cell system 100 has started operating.

The controller 80 determines whether the reduction of the insulation resistance has occurred (S310). When the reduction of the insulation resistance has not occurred (S310, NO), the controller 80 determines whether the power switch has been turned OFF (S330). When the power switch has been turned OFF, the controller 80 makes the fuel cell system 100 transition to a stopped state to make the fuel cell vehicle 1 transition to a parked state.

The controller 80 repeats the determination in S310, until the power switch is turned OFF (S330, NO). When the power switch has been turned OFF (S330, YES), the controller 80 determines whether reduction of the insulation resistance has been detected in the current trip (S340). When no reduction of insulation resistance has been detected (S340, NO), the controller 80 terminates the power leakage detection processing.

When the reduction of the insulation resistance has occurred (S310, YES), the controller 80 turns ON a warning light. The warning light is disposed on a dashboard to be visible by the driver. When the power switch is turned OFF thereafter (S330, YES), the result of the determination in S340 is YES, and the controller 80 electrically isolates the low voltage auxiliary machine 95, the air compressor MG1, and the drive motor MG2 (S350).

Next, the controller 80 determines whether the insulation resistance is still reduced (S360). When the insulation resistance has returned to the normal value (S360, NO), the power leakage area is identified (S370). The identifying the power leakage area means identifying an area of any one of the low voltage auxiliary machine 95, the air compressor MG1, and the drive motor MG2 as an area where the power leakage is occurring.

When the insulation resistance is still reduced (S360, YES), power leakage area identification processing is executed (S400).

Figure 5:
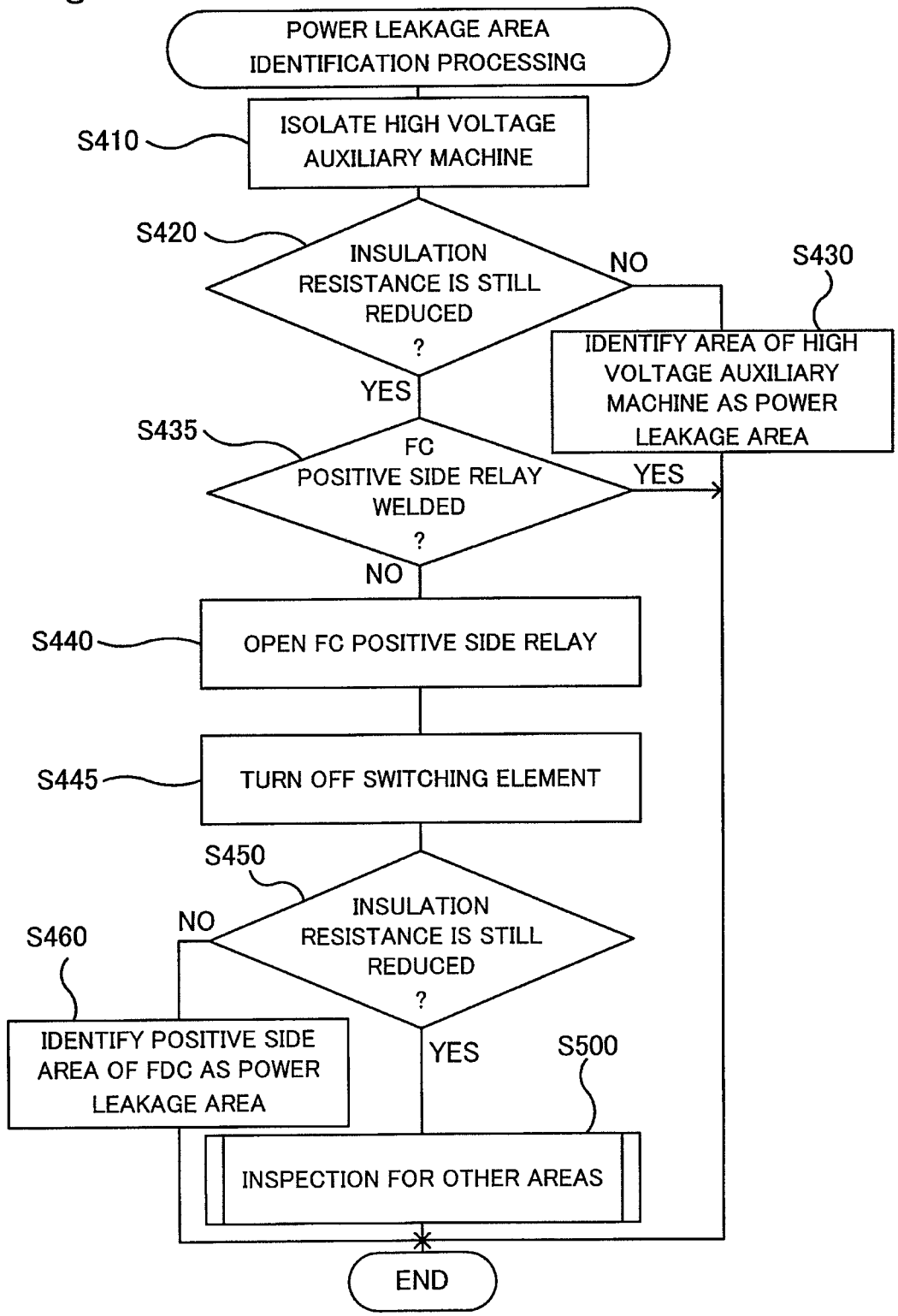
FIG. 5 is a flowchart illustrating power leakage area identification processing.

FIG. 5 is a flowchart illustrating power leakage area identification processing. First of all, the controller 80 isolates the high voltage auxiliary machine 90 (S410). Specifically, the controller 80 controls the step-up DC/DC converter 91 to electrically disconnect the high voltage auxiliary machine 90 from the wiring 65 and the primary side wiring 70a.

Next, the controller 80 determines whether the insulation resistance is still reduced (S420). When the insulation resistance has returned to the normal value (S420, NO), the controller 80 identifies the area of the high voltage auxiliary machine 90 as the power leakage area (S430), and terminates the power leakage area identification processing.

When the insulation resistance is still reduced (S420, YES), the controller 80 determines whether the FC positive side relay FCRB is welded (S435). The determination in S435 according to the present embodiment is carried out as follows. Specifically, control is performed to open the FC positive side relay FCRB and to close the FC negative side relay FCRG and the FC pre-charge relay FCRP, while producing a potential difference between lines of the primary side wiring 20a with voltage produced by the secondary battery 50. The welding is determined not to have occurred when a measurement value obtained by the current sensor 22 as a result of this control is substantially zero, and is determined to have occurred when the measurement value obtained by the current sensor 22 is equal to or larger than a predetermined value. Ii another embodiment, a dedicated circuit may be provided to detect the welding.

When the FC positive side relay FCRB is welded (S435, YES), the controller 80 terminates the power leakage area identification processing. This is because the subsequent steps cannot be appropriately implemented with the FC positive side relay FCRB welded. When the FC positive side relay FCRB is welded, the controller 80 stores information indicating that the FC positive side relay FCRB is welded.

When the FC positive side relay FCRB is not welded (S435, NO), the controller 80 opens the FC positive side relay FCRB (S440).

Next, the controller 80 controls the switching element Sa to be OFF (S445). Next, the controller 80 determines whether the insulation resistance is still reduced (S450). When the insulation resistance has returned to the normal value (S450, NO), the controller 80 identifies a positive side area of the FDC 20 as the power leakage area (S460).

When the insulation resistance is still reduced (S450, YES), other areas are inspected (S500).

FIG. 6 is a flowchart illustrating the inspection for the other areas. The controller 80 determines whether at least one of the FC negative side relay FCRG and the FC pre-charge relay FCRP is welded (S505), as in S435.

When at least one of the FC negative side relay FCRG and the FC pre-charge relay FCRP is welded (S505, YES), the controller 80 terminates the power leakage area identification processing. This is because the subsequent steps cannot be appropriately implemented with the FC positive side relay FCRB welded. When at least one of the FC negative side relay FCRG and the FC pre-charge relay FCRP is welded, the controller 80 stores information indicating that at least one of the FC negative side relay FCRG and the FC pre-charge relay FCRP is welded.

When none of the FC negative side relay FCRG and the FC pre-charge relay FCRP is welded (S505, NO), the controller 80 opens the FC negative side relay FCRG and the FC pre-charge relay FCRP (S510).

Next, the controller 80 determines whether the insulation resistance is still reduced (S520). When the insulation resistance has returned to the normal value (S520, NO), the controller 80 identifies the area of the fuel cell stack 10 as the power leakage area (S430), and terminates the inspection for the other areas. Specifically, the area of the fuel cell stack 10 includes the fuel cell stack 10, the primary side wiring 20a between the fuel cell stack 10 and the FC relay circuit 30, and the fuel cell voltage sensor 12.

A positive side of the primary side wiring 20a between the fuel cell stack 10 and the FC relay circuit 30 is wiring between the fuel cell stack 10 and the FC positive side relay FCRB. A negative side of the primary side wiring 20a between the fuel cell stack 10 and the FC relay circuit 30 includes wiring between the fuel cell stack 10 and the FC negative side relay FCRG and wiring branched for the FC pre-charge relay FCRP. The branched wiring includes the limiting resistor R.

When the insulation resistance is still reduced (S520, YES), the controller 80 identifies any one of the area of the secondary battery 50 and a DC area as the power leakage area (S540). The area of the secondary battery 50 is an area between the secondary battery 50 and the secondary battery relay circuit 60. The DC area is an area surrounded by the FDC 20, the inverter 40, the secondary battery relay circuit 60, the step-up DC/DC converter 91, and the step-down DC/DC converter 96.

Since the inverter 40, the step-up DC/DC converter 91, and the step-down DC/DC converter 96 perform isolation any one of the area of the secondary battery 50 and the DC area can be identified as the power leakage area. In another embodiment, when at least one of the inverter 40, the step-up DC/DC converter 91, and the step-down DC/DC converter 96 may not perform isolation, the non-isolated area is also included in the identified area in S540.

In the present embodiment described above, when the power leakage is occurring in any one of the positive side area of the FDC 20 and the area of the fuel cell stack 10, it can be determined the power leakage occurs in which areas.

When the FC positive side relay FCRB, the FC negative side relay FCRG, and the FC pre-charge relay FCRP are opened at the same timing unlike in the present embodiment, whether the area of the fuel cell stack 10 or the positive side area of the FDC 20 is the power leakage area cannot be determined with the insulation resistance returning to the normal value. This is because the AC signal cannot reach the positive side area of the FDC 20 when all of the FC positive side relay FCRB, the FC negative side relay FCRG, and the FC pre-charge relay FCRP are open.

The AC signal cannot reach the positive side area of the FDC 20 because the AC signal is blocked by the backflow preventing diode DX on the positive side of the primary side wiring 20a, and because the switching element Sa is controlled to be OFF in the present embodiment. The AC signal has low voltage and cannot pass through the step-up diode Db in a forward direction.

A third embodiment is described. The description on the third embodiment mainly focuses on matters different from the second embodiment. Matters not specifically described are the same as those in the second embodiment.

FIG. 7 is a flowchart illustrating power leakage area identification processing. Steps denoted with the same numbers as the counterparts in the second embodiment involve the same operations as those in the counterparts in the second embodiment, and description thereof is omitted.

When the FC positive side relay FCRB is opened in S440, the controller 80 determines whether at least one of the FC negative side relay FCRG and the FC pre-charge relay FCRP is welded, in S505. When a result of the determination in S505 is NO, the controller 80 performs inspection for other areas (S600).

FIG. 8 is a flowchart illustrating the inspection for the other areas. The controller 80 opens the FC negative side relay FCRG and the FC pre-charge relay FCRP (S610). Next, the controller 80 controls the switching element Sa to be OFF (S615). In the present embodiment, S445, S610, and S615 are also collectively referred to as isolation processing.

Next, the controller 80 determines whether the insulation resistance is still reduced (S620). When the insulation resistance is still reduced (S620, YES), the controller 80 identifies any one of the area of the secondary battery 50 and the DC area as the power leakage area (S630).

When the insulation resistance has returned to the normal value (S620, NO), the controller 80 controls the switching element Sa to be ON (S640). When the switching element Sa is controlled to be ON, the AC signal can reach the positive side area of the FDC 20.

Then, the controller 80 determines whether reduction of the insulation resistance has occurred (S650). When the reduction of the insulation resistance has occurred (S650, YES), the controller 80 identifies the positive side area of the FDC 20 as the power leakage area (S660). When the reduction of the insulation resistance has not occurred (S650, NO), the controller 80 identifies the positive side area of the FDC 20 as the power leakage area (S670).

With the present embodiment described above, the same effects as those obtained in the second embodiment can be obtained.

The present disclosure is not limited to the embodiments described above, and may be implemented in various ways without departing from the gist of the present disclosure. For example, the technical features in the embodiments corresponding to the technical features in each aspect described in the summary section can be replaced or combined as appropriate in order to partially or entirely solve the problem described above or to partially or entirely achieve the advantageous effects described above. Some technical features that are not described as being essential herein can be omitted as appropriate. For example, the following exemplary embodiments may be employed.

In the second embodiment, the high voltage auxiliary machine 90 may be isolated after the FC positive side relay FCRB has been opened. For example, before the inspection for the other areas is performed with the result in S450 being YES, the high voltage auxiliary machine 90 may be isolated, and whether the power leakage is occurring in the area of the high voltage auxiliary machine 90 may be determined.

In the third embodiment, the high voltage auxiliary machine 90 may be isolated after the FC negative side relay FCRG and the FC pre-charge relay FCRP have been opened. For example, the high voltage auxiliary machine 90 may be isolated when a result of the determination in S620 is NO. Operations in S640 and after may be performed when the insulation resistance is still reduced after the high voltage auxiliary machine 90 has been isolated.

In the third embodiment, the high voltage auxiliary machine 90 may be estimated to be an area where no power leakage is occurring, and thus may not be isolated.

The FC relay circuit 30 may not include the FC pre charge relay FCRP and the limiting resistor R.

The FDC 20 may not include the step-up diode Db.

The power leakage area identification processing may be executed in a state where the fuel cell vehicle is in drivable state. For example, the processing may be implemented while waiting at the traffic light. When the processing is executed in the drivable state, the inverter 40, the step-up DC/DC converter 91, and the step-down DC/DC converter 96 may not perfume isolation.

The power leakage detector 200 may not be installed in the fuel cell vehicle 1. In such a configuration, the power leakage detector 200 may be connected to the circuit system 270 when the power leakage area identification processing is executed.

The functions and processing implemented with software in the embodiments described above may partially or entirely be implemented with hardware. The functions and processing implemented with hardware may partially or entirely be implemented with software. The hardware may be various circuits including an integrated circuit, a discrete circuit, and a circuit module as a combination of these circuits.

The fuel cell vehicle may be a connected car. The connected car is an automobile that includes a communication device and can receive services by communicating with a cloud.

What is claimed is:

1. A fuel cell system comprising:
   a fuel cell stack;
   a diode that prevents backflow of current to a positive electrode of the fuel cell stack;
   a relay circuit including:
      a negative side relay corresponding to a negative electrode of the fuel cell stack; and
      a positive side relay arranged between the positive electrode of the fuel cell stack and the diode;

a power leakage detector configured to output a power leakage detection signal to be input to the fuel cell stack via the negative side relay, and detect reduction of insulation resistance; and
a controller programmed to control opening/closing of the positive side relay, control opening/closing of the negative side relay, and acquire a detection result from the power leakage detector,
wherein the controller is further programmed to execute isolation processing by opening the positive side relay when the reduction of the insulation resistance is detected in a state where the positive side relay and the negative side relay are closed, and to identify that power leakage is occurring in an area between the positive side relay and the diode when the insulation resistance has returned to a normal value as a result of the isolation processing.

2. The fuel cell system in accordance with claim 1, wherein
the controller is further programmed to open the negative side relay when the insulation resistance is still reduced after the isolation processing, and to identify that the power leakage is occurring in an area of the fuel cell stack when the insulation resistance has returned to the normal value as a result of opening the negative side relay.

3. The fuel cell system in accordance with claim 1, wherein
the controller is further programmed to open the negative side relay when the insulation resistance is still reduced after the isolation processing, and to identify that the power leakage is occurring in an area other than the area between the positive side relay and the diode or an area other than an area of the fuel cell stack when the insulation resistance is still reduced after the negative side relay has been opened.

4. A fuel cell system comprising:
a fuel cell stack;
a diode that prevents backflow of current to a positive electrode of the fuel cell stack;
a switching element disposed between the fuel cell stack and the diode and having a function of switching a conductive state between wiring connected to a negative electrode of the fuel cell stack and wiring connected to the positive electrode of the fuel cell stack;
a relay circuit disposed between the fuel cell stack and the switching element, the relay circuit including a positive side relay corresponding to the positive electrode of the fuel cell stack, and a negative side relay corresponding to the negative electrode of the fuel cell stack;
a power leakage detector configured to output a power leakage detection signal to be input to the fuel cell stack via the negative side relay, and detect reduction of insulation resistance; and
a controller programmed to control opening/closing of the positive side relay, control opening/closing of the negative side relay, control the switching element, and acquire a detection result from the power leakage detector,
wherein the controller is further programmed to execute isolation processing by opening the positive side relay, opening the negative side relay, and by putting the switching element in an isolated state when the reduction of the insulation resistance is detected in a state where the positive side relay and the negative side relay are closed, to execute conduction control by putting the switching element in a conductive state while maintaining a state where the positive side relay and the negative side relay are open when the insulation resistance has returned to a normal value as a result of the isolation processing, and to identify that power leakage is occurring in an area between the positive side relay and the diode when the reduction of the insulation resistance occurs as a result of the conduction control by putting the switching element in the conductive state.

5. The fuel cell system in accordance with claim 4, wherein the controller is further programmed to identify the power leakage is occurring in an area of the fuel cell stack when the insulation resistance is at a normal value after the conduction control.

6. The fuel cell system in accordance with claim 4, wherein the controller is further programmed to identify the power leakage is occurring in an area other than the area between the positive side relay and the diode or an area other than an area of the fuel cell stack when the insulation resistance is still reduced after the isolation processing.

7. The fuel cell system in accordance with claim 1 further comprising:
a high voltage auxiliary machine; and
a circuit capable of electrically isolating the high voltage auxiliary machine from the fuel cell stack, wherein
the controller is further programmed to control the circuit to electrically isolate the high voltage auxiliary machine from the power leakage detector, before executing the isolation processing, and to identify the power leakage is occurring in an area of the high voltage auxiliary machine when the insulation resistance has returned to the normal value as a result of isolating the high voltage auxiliary machine.

8. The fuel cell system in accordance with claim 1, wherein the controller is programmed to execute the isolation processing when the fuel cell system transitions to a stopped state.

9. The fuel cell system in accordance with claim 4 further comprising:
a high voltage auxiliary machine; and
a circuit capable of electrically isolating the high voltage auxiliary machine from the fuel cell stack, wherein
the controller is further programmed to control the circuit to electrically isolate the high voltage auxiliary machine from the power leakage detector, before executing the isolation processing, and to identify the power leakage is occurring in an area of the high voltage auxiliary machine when the insulation resistance has returned to the normal value as a result of isolating the high voltage auxiliary machine.

10. The fuel cell system in accordance with claim 4, wherein the controller is programmed to execute the isolation processing when the fuel cell system transitions to a stopped state.

* * * * *